Patented Apr. 22, 1930

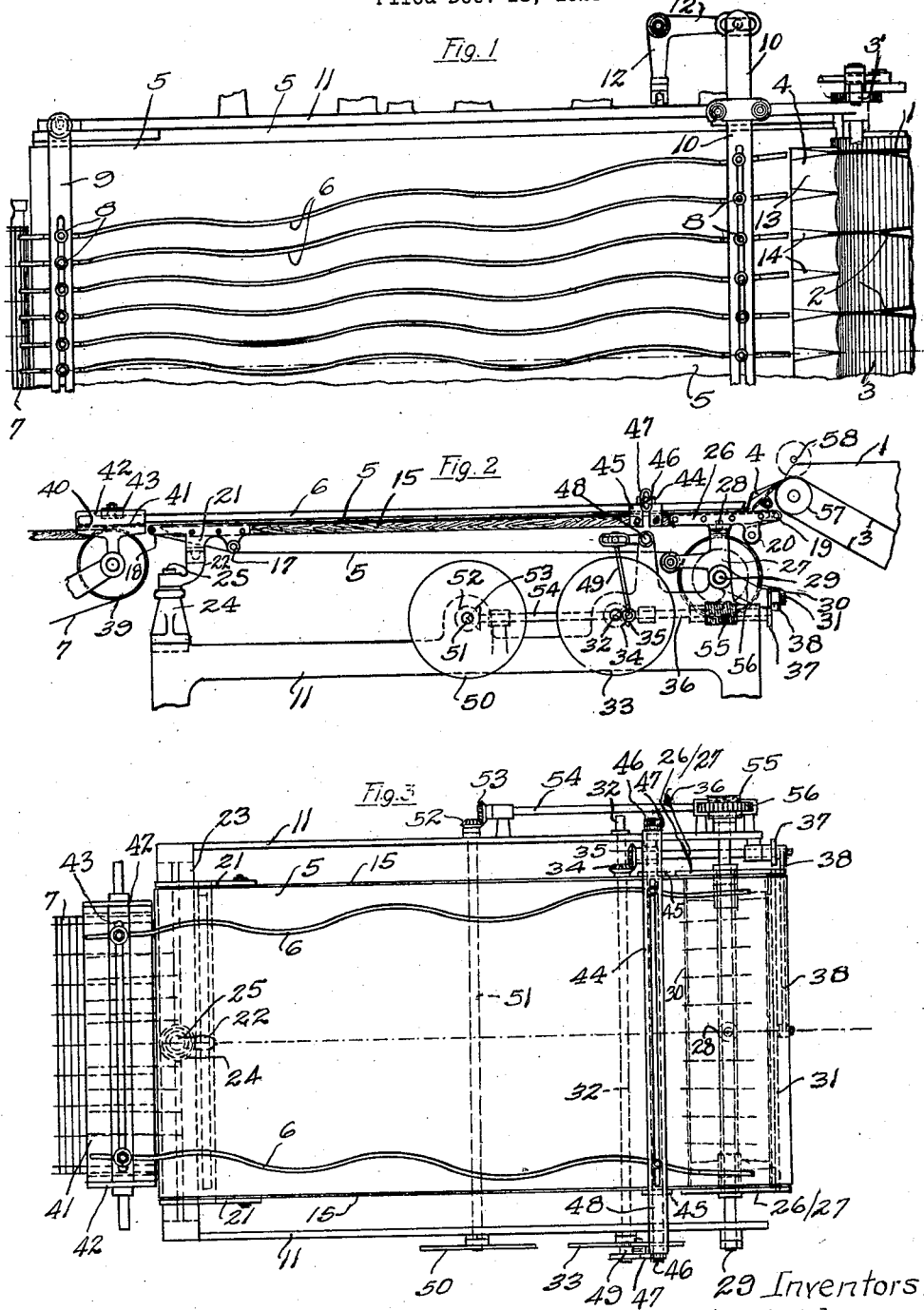

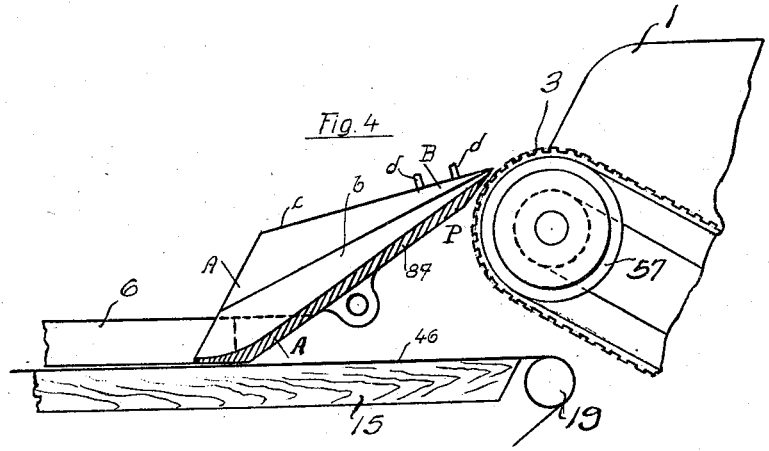
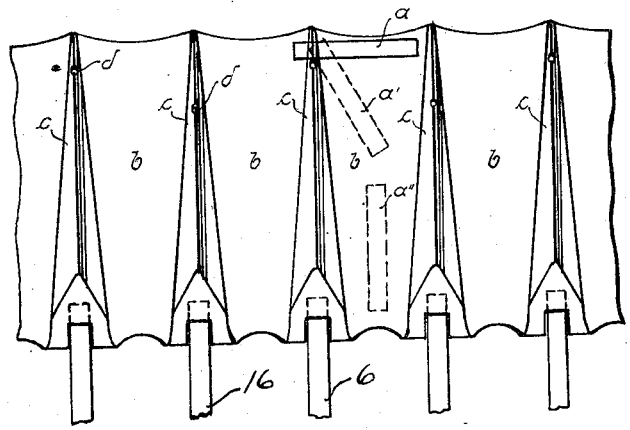
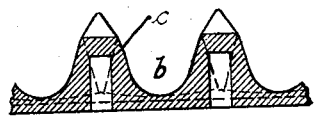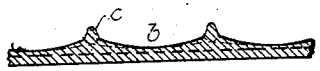

1,755,721

UNITED STATES PATENT OFFICE

ALFRED WINKLER AND MAX DÜNNEBIER, OF NEUWIED, GERMANY

APPARATUS FOR HANDLING ARTICLES

Application filed December 18, 1928, Serial No. 326,793, and in Germany February 28, 1927.

This invention relates to improvements in or modifications of the apparatus, which forms the subject matter of the application for Letters Patent Serial No. 326,792, for automatically setting upright sweetmeats, fondants and other articles and delivering them to a coating machine or other similar machine, and a primary object of the invention is to perfect the apparatus described in the aforesaid application so that its satisfactory operation on sweetmeats and the like of all kinds and shapes is ensured.

Different constructional embodiments of the present invention are illustrated by way of example in the accompanying drawing, in which Fig. 1 is a part plan of an apparatus having guide rails which swing about one of their ends, Fig. 2 is a side elevation of a modified form of apparatus in which the conveyor band swings transversely to its direction of travel, while the guide rails are moved backwards and forwards parallel to the direction of travel, Fig. 3 is a plan of the apparatus shown in Fig. 2, Fig. 4 shows the inclined slide between the charging container and the conveyor band in section along the direction of travel of the pieces, the parts connected by the slide being also shown, this slide, with or without the guide rail receiving slots, applies to the various modifications, Fig. 5, is a plan of the inclined slide viewed at right angles to Fig. 4, Fig. 6 is a section through the inclined slide transversely to the path of the pieces on the line A—A of Fig. 4 and viewed at right angles to this line, and Fig. 7 is a similar section on the line B—B of Fig. 4.

Referring to Fig. 1 of the drawing, the apparatus comprises a receptacle 1 subdivided into individual chambers by means of walls 2. The bottom of this receptacle is formed by a conveyor belt 3 which slopes downwardly towards the rear, i. e. to the right in the drawing, and has a suitably roughened surface, this belt being operated by intermittent feed mechanism 3′ or in other suitable manner. The belt 3 communicates with an inclined slide 4 which delivers to a continuously moving endless band 5, and mounted over the band 5 are guide rails 6 connected by means of screws 8 to end rails 9, 10, the said rails 6 extending from the slide 4 to a grating 7. The rails 6 are bent in wavy form along their entire length and as far as the slide 4 and swing only about the point at whch they are fixed to the cross rail 9, which latter is secured to the side frames 11 of the machines. The other ends of the guide rails 6 directly engage the cross rail 10, which serves the purpose of moving them backwards and forwards. It is connected in this case with the arm 12, which is directed towards the right of the two-armed lever which lies in a horizontal plane and is rocked in any suitable or well known manner. The pieces are therefore intensively shaken directly they reach the conveyor band 5 from the inclined slide 4, which is provided with partitions 14 forming channels 13. The transverse movement of the right hand end of the guide rails 6 need not be very great, because, owing to the convergent paths and wavy form of the guide rails, the pieces, which naturally tend to move in a straight line with the band 5, are compelled to be continuously meeting the rails 6. This relatively small transverse movement of the guide rails 6 in combination with the form of construction of the slide 4, which is hereinafter describes, prevents the pieces reaching one of the tracks which they are not intended to reach.

In the apparatus according to Figs. 2 and 3 a more intensive shaking of the pieces on the conveyor band 5 is effected by giving the conveyor band 5 itself a backward and forward movement transversely to its direction of travel and the guide rails 6 a similar movement but in the same direction as the direction of travel of the band. For this purpose the following arrangement is employed.

The table 15 which carries the conveyor band 5 and in which the guide rollers 16, 17, 18, 19 and 20 of the band are journalled, rests with its left end in a frame 21 which has in the central axes of the table a downwardly projecting arm 22 having a vertical bore. The sides 11 of the machine, which are in this case of frame-like construction, are connected together by means of a bridge 23, which carries at its centre a column 24 on which the arm 22 rests and is guided by a bolt 25. In this manner the table 15 and the conveyor band 5 which is conducted over it can be swung about the bolt 25. The right hand end of the table 15 is also fastened in a frame 26 the cross rail of which runs under the table and is connected in the centre of the table with a second lower frame 27 by means of a bolt 28. This lower frame 27 is inserted over the shaft 29 of the band pulley 30 in such a manner that the latter is guided exactly between its sides. Each of these sides of the frame 27 carries an arm which is inclined obliquely downwards towards the right and a cross-rail 31 connects the two arms together. Thus, according to what has previously been stated, by moving the lower frame 27 on the shaft 29 the band pulley 30 is also moved, being secured for this purpose on the shaft by means of a key. On such a movement of the lower frame 27 taking place the upper frame 26 moves with it and simultaneously turns about the bolt 28. Since the lateral movement of the table is very small, the alternately unequal tension of the conveyor band 5 which thereby occurs does not cause any noticeable trouble, and further it may be neutralized by carrying the roller 20 in a suitable yielding bearing, which is not however indicated in the drawing for the sake of clearness.

The backward and forward movement of the pulley 30 and the right hand end of the table is carried out in the following manner.

The shaft 32 of the friction disc 33 carries at the opposite end to the latter a bevel wheel 34 which drives, through the agency of a second bevel wheel 35, the shaft 36 together with the eccentric 37 fixed on its right-hand end. A crank or connecting rod 38 coacts with the eccentric 37 and with its other end with the cross-rail 31 which connects the arms of the frame 27. It is clear that in this way by driving the friction disc 33, a backward and forward movement of the frame 27 together with the pulley 30 and the frame 26 which carries the right hand end of the table is effected. The eccentric 37 is adjustable so that the stroke of the drive for moving the table can be varied.

Instead of the above-described backward and forward movement of the table, a circular movement having a similar effect may be produced by means of a suitable arrangement, without departing from the scope of the invention.

For the simultaneous backward and forward longitudinal movement of the guide rails 6 the following arrangement is employed.

All the guide rails 6, of which only the two outer rails are shown in Fig. 3, extend with their left hand ends over the guide roller 39 of the coating grid 7 and rest there with a projection 40 provided on their lower surface on a metal plate 41 which is arranged above the guide roller 39 at the same height as the conveyor band 5 and is fastened to the two side portions 42 of the frame of the machine. These side portions 42 are so high that the cross rail 43, which connects the guide rails 6, can be guided with its ends between them. The right hand end of the guide rails 6 is also connected by a cross rail 44, which lies at each side of the table 15 on a slide 45 which is screwed to the table. In this manner the guide rails are held at a small distance from the conveyor band 46 owing to their lying on the one hand on the metal plate 41 and on the other hand on the slides 45. Pins 46, in which the slots of the levers 47 engage, are provided in the two ends of the cross rail 44. These levers are fixed on a shaft 48 which is journalled in the two frames of the machine. The lever 47 on the left hand side of the machine facing the onlooker (Fig. 2) is formed as an angle lever, and a crank-rod 49 movably engages in a slot in its other arm. This rod is connected with the friction disc 33, which is at the same time constructed as an eccentric, in such a manner that the backward and forward longitudinal movement of the guide rails 6 is produced by its rotation. By adjusting the rod 49 in the slot of the left hand lever 47 the stroke of this longitudinal movement can also be altered.

The metal plate 41 on which the left-hand ends of the guide rails rest has for its primary object to ensure that the work-pieces are transferred from the conveyor band 5 onto it so that they are arranged in close succession in rows upon it. They are therefore received by the coating grid 7 at equal distances apart, which distances can be regulated as desired by suitably adjusting the speed of the movements of the coating grid 7 and of the conveyor band 5.

The drive of the pulley 30 is also in this case effected from the friction disc 50 through the agency of its shaft 51, the pair of bevel wheels 52, 53, the shaft 54, the worm 55 and the worm wheel 56, which is fitted on the shaft 29 of the pulley 30. The friction discs 33, 50 are driven by means of suitable adjustable friction wheels not shown; and the drive of the conveyor band 3 in the receptacle or charging container 1, is effected in any suitable manner so that the relative speeds may be varied to suit requirements. All these driving arrangements are of any convenient or well known type and are not illustrated in the drawing, more particularly as they are not of importance for the present invention.

The feed belt 3 and the inclined slide 4 are shown in side view at Fig. 2, but—for the sake of clearness—are omitted from Fig. 3. The drive for the belt 3 may be effected intermittently through suitable known means from the shaft 32 of the disc 33, the upper roller 57 of the belt being operated by the feed mechanism 3'. In Fig. 2 the shaft 58 carries in the known manner a number of round brushes adapted to be turned for the purpose of removing obstructions at the outlets from the receptacle 1.

In Figs. 4-7, the new construction of the inclined slide 4 is illustrated. This effects the transfer of the pieces from the conveyor band 3 of the receptacle or charging container 1, which conveyor band is guided over the roller 57, onto the conveyor band 5, so that they arrive in the guide tracks formed by the guide rails 6.

The slide 4 is provided with concave hollows $b$ corresponding in number to the number of the guide tracks. At its upper edge where it abuts against the conveyor band 3 of the charging container 1 these hollows are very flat and of such a width that they are separated only by a narrow and low projection $c$. Towards the lower end where the slide 4 leads to the conveyor band 5 the depth of the hollows $b$ gradually increases and their width gradually decreases (see Fig. 6). The projections $c$ between the hollows on the other hand increase in height and width towards the lower end of the slide and the dividing surface between them is shaped similarly to the ridge of a roof, so that the pieces are prevented from lying on their surfaces. In the example illustrated pins $d$ are fitted alternately higher up and lower down, i. e., staggered, in the dividing surfaces of the projecting partitions $c$. If now a piece $a$ from the conveyor band 3 arrives on the slide in the position illustrated in Fig. 5 and its end knocks against the pin $d$, this side of it is held up by the pin and it is compelled to turn, so that it next assumes the dotted position $a'$ so as to free itself entirely from the pin $d$. Then, owing to the action of the partition walls of the hollows, which walls are increasingly inclined as they approach the lower edge of the slide, it is compelled to lie longitudinally in the hollow and to slide down into the position $a''$, and to reach the band 5 between the guide rails 6, which connect with the lower end of the slide. As may be seen, the width of the projecting partition $c$ at the lower end of the slide 4 allows the rails 6 to make a sufficiently great transverse movement without there being any danger of the pieces arriving in the wrong guide track.

According to Figs. 4 and 5 the rails 6 are adapted for movement in a longitudinal direction as in the arrangement shown at Figs. 2 and 3, the rail ends being caused to engage slots in the under part of the slide 4; and it will be understood that where the rails are adapted to move crosswise—as in the form shown at Fig. 1—the rail ends are stopped clear of the lower edge of the slide 4, and it will be seen that the width of the partitions $c$ at the lower edge of the slide is such that this movement of the rails is permitted without danger of the pieces entering into the wrong spaces between the rails.

If the projecting partitions $c$ are not made of uniform length up to the upper end of the slide as shown in the drawing, but each alternate one is made shorter than the slide and is broken off with its surface projecting above the slide, then the pins $d$ are obviously superfluous and the same result will be obtained without them.

What we claim is:—

1. Apparatus of the character described for the supply of articles in an upright position, comprising conveying means for the articles, guide rails of wavy form, and means for imparting side movement to the conveying means in its own plane to shake the said articles.

2. Apparatus of the character described for the supply of articles in an upright position, comprising conveying means for the articles, guide rails of wavy form, means for imparting side movement in its own plane to said conveying means, and means for moving the guide rails backwardly and forwardly in a direction parallel to the direction of travel of the conveying means, to shake the said articles.

3. Apparatus of the character described for the supply of articles in an upright position, comprising conveying means for the articles, guide rails of wavy form, means for imparting to said conveying means movement in its own plane and in a circular path, and means for moving the rails backwardly and forwardly in a direction parallel to the direction of travel of the conveying means to shake the articles on the conveying means.

4. Apparatus of the character described for the supply of articles in an upright position, comprising conveying means for the articles, guide rails of wavy form, means for producing a relatively transverse movement between the guide rails and the conveying means, a container for the articles, and an inclined slide for receiving the articles from the container and for delivering them to the conveying means, this slide being formed with a plurality of channels which convey the said articles, said channels being wide and shallow at their receiving ends and narrow and deep at their delivery ends.

5. Apparatus according to claim 4, comprising partition walls formed on the said slide between the channels, these walls being of inverted V-shape in cross-section, and increasing in width and depth from the receiving to the delivery ends of the said channels.

6. Apparatus according to claim 4, comprising partition walls formed on the said slide between the channels, and pins projecting from the said walls and arranged in staggered relation to each other to engage the articles in the manner described.

7. Apparatus of the character described for supplying articles in an upright position, comprising conveying means for articles, guide rails of wavy form, and means for producing a relatively transverse movement between the guide rails and the conveying means.

8. Apparatus of the character described for supplying articles in an upright position, comprising conveying means for articles, an inclined slide to supply articles to the conveying means, said slide comprising a plurality of channels decreasing in width from the top to the bottom, said channels being separated by partition walls increasing in width from the top of the slide to the bottom, guide rails of wavy form, and means for producing a relatively transverse movement between the guide rails and the conveying means.

9. Apparatus of the character described for supplying articles in an upright position, comprising conveying means for articles, guide rails of wavy form, means for producing a relatively transverse movement between the guide rails and the conveying means, means for receiving the articles from said conveying means, and a stationary surface interposed between said conveying and receiving means, over which said articles are pushed in close succession by said conveying means.

In testimony whereof we have signed our names to this specification.

ALFRED WINKLER.
MAX DÜNNEBIER.